Patented May 24, 1927.

1,629,733

UNITED STATES PATENT OFFICE.

BALTZAR CARL von PLATEN AND CARL GEORG MUNTERS, OF STOCKHOLM, SWEDEN, ASSIGNORS TO ELECTROLUX SERVEL CORPORATION, OF NEW YORK, N. Y., A CORPORATION OF DELAWARE.

REFRIGERATION.

No Drawing. Application filed December 7, 1926, Serial No. 153,221, and in Sweden August 18, 1922.

This application relates back to the filing date of and rights incident to our copending application Serial No. 130,086 filed August 18, 1926 (now Patent No. 1,609,334 dated December 7, 1926) and, through that application, to our application Serial No. 596,646 filed October 24, 1922, which it replaced and for the subject matter of which an application was filed in Sweden August 18, 1922, and to our copending application Serial No. 655,768 filed August 4, 1923, which has resulted in Patent No. 1,620,843 dated March 15, 1927.

Our invention relates to refrigeration of the type wherein change of one or more fluids from liquid to gaseous state causes absorption of heat from the surroundings and wherein a solvent for refrigerant fluid is used and additional fluid introduced into the presence of fluid of evaporation for equalizing pressure.

More specifically our invention relates to refrigeration of the absorption type employing an auxiliary agent in the presence of which a cooling agent evaporates.

While there have been no successful results in this type of refrigeration prior to our activity in the fields, some work has been done along these lines wherein three fluids have been caused to co-operate in the same system, these fluids consisting of ammonia, air and water.

Ammonia has the chemical formula $NH_3$: water has the chemical formula $H_2O$; and air is a mixture of oxygen (O) and nitrogen (N), not chemically combined. This group of substances used in a metal apparatus such as iron or steel is not stable. The oxygen of the air combines with iron of the apparatus to give oxides of various constituencies. That is, the O leaves the air and rusts iron. Ammonia dissociates into nitrogen (N) and hydrogen (H). Although this process is slow and takes place more particularly at high temperatures, it does take place to some extent and even the slow rate becomes an important factor in a refrigerating apparatus which is intended or should be intended to function for years without loss of efficiency. Likewise, the $H_2O$ tends to a certain extent to dissociate and change its form. The result of this action is a gradual change of fluids and a decrease in efficiency. A refrigerating apparatus containing this combination of substances should be refilled time and time again.

We have discovered that a much better refrigerating effect in this type of refrigeration and a stable relation can be obtained by a group of substances consisting of ammonia as a cooling agent or refrigerant, hydrogen as an auxiliary agent, in the presence of which the ammonia evaporates, and water as the absorption liquid which separates ammonia from hydrogen and from which ammonia vapor is expelled. We attribute the success of this group of substances as a refrigerating material to series of conditions now to be set out. These three substances have a common constituent, namely H. The H as the auxiliary agent acts to stabilize the other constituents of the groups. Ammonia tends to break up into H and N. Water also tends to a certain extent to break up into H and O. It might be said that in each case the H tries to separate itself from its companion. Now when H is introduced as a third substance, it forms a resistance to the H's which are attempting separation. It is an atmosphere of saturation, wherefore the H's in the ammonia and water have no line of less resistance than the tendency to stay in chemical combination. Therefore the H's stay in union with the N and O. The auxiliary H exerts a sort of pressure on the H molecules of the ammonia and water and prevent dissociation. Since the relation of substances is fixed by the relation of hydrogen molecules, the N and O in ammonia and water do not break away.

The ability of the auxiliary hydrogen to form a kind of resistance against the tendency of dissociation of, for example, the refrigerant ammonia or another refrigerant which includes hydrogen as an element, will further be understood from the following.

Assuming ammonia has dissociated into nitrogen and hydrogen until a state of equilibrium has been reached, the relation of the partial pressures of these substances is, according to Haber, given by the following formula:

$$P_{NH_3} = K_T \cdot P_{N_2}^{\frac{1}{2}} \cdot P_{H_2}^{\frac{3}{2}}$$

wherein $P_{NH_3}$ is the partial pressure of the ammonia,
$P_{N_2}$ is the partial pressure of the nitrogen,
$P_{H_2}$ is the partial pressure of the hydrogen,
$K_T$ is constant.

It will be seen from this formula that, if ammonia dissociates into nitrogen and hydrogen, the partial pressure of the hydrogen molecule must be increased to a degree much higher than the partial pressure of the nitrogen molecule expelled. Now an auxiliary agent can be chosen which comprises those elements and which also form the elements of the cooling agent so that these form a resistance to the increase of partial pressure of said elements in the case of dissociation. In order to effect this purpose when using ammonia as cooling agent, the auxiliary medium ought to contain hydrogen and nitrogen in a proportion corresponding to the values of the partial pressures of the nitrogen and hydrogen as set forth in the above formula. Such an atmosphere will, however, contain only a very small amount of nitrogen, and it will thus be clearly seen that it is mainly the hydrogen which forms a resistance to the rise of the partial pressure of the hydrogen molecule expelled from the ammonia on dissociation thereof.

Now hydogen has another advantage in that an atmosphere of hydrogen forms a very small reistance to the diffusion of ammonia therein. This may be ascribed partly to the low molecular weight of hydrogen. It is therefore possible during a certain period of time to evaporate and diffuse more ammonia into the hydrogen atmosphere than into a corresponding atmosphere of air. The diffusion of substances into one another increases with the decrease of molecular weight of the substance forming the atmosphere into which the other diffuses. Nitrogen has a higher molecular weight than hydrogen and even a small amount of nitrogen in the inert atmosphere would to a certain extent decrease the advantage of low molecular weight, and we therefore prefer to use hydogen alone as auxiliary agent, as this medium, when used with ammonia as a refrigerant, forms the main reistance against the dissociation of the ammonia and at the same time gives a high possibility for evaporation of the ammonia. The use of nitrogen as a constituent of the auxiliary agent is therefore dispensed with, as its advantage as a resistance to dissociation is outweighed by the disadvantage of its presence in the atmosphere into which cooling agent diffuses.

It will therefore be evident that an apparatus in which ammonia is used as a cooling agent and hydrogen as auxiliary agent and for example water as an absorption liquid will give a high and durable efficiency of operation due to the fact that dissociation of the ammonia is prevented and rapid diffusion is obtained.

Furthermore, hydrogen has, as is known, a high capacity of heat transmission which is many times higher than that of air. This advantageous feature is of very great importance in view of the processes taking place in the evaporator and absorber and especially in apparatus provided with a heat exchanger for the gases between the evaporator and the absorber. It is clear that the use of an auxiliary agent with a high capacity of heat transmission is desirable. The surface for the transmission of heat from one of the gases to the other in this exchanger is dependent on the capacity of heat transmission of the gas, and when using a gas with a high heat transmission capacity it is possible to reduce the dimensions of the heat exchanger to such a degree that this can be provided in an apparatus without any difficulties. The advantages above pointed out are obtainable by using gases of low molecular weight, as in this case hydrogen.

While we have described one particular group and claim that group, it is to be understood that we do not limit ourselves to this specific cooperating group but intend to include, within the scope of the claims hereunto appended, other groups which fall within the principles above set up.

Having thus described our invention, what we claim is:

1. A group of cooperating substances for refrigeration consisting of a gaseous cooling agent, a solvent therefor and an auxiliary agent which is non-soluble in the solvent, the substances having a common chemical constituent and the auxiliary agent being of low molecular weight relative to the cooling agent.

2. As a material for refrigeration, the group of cooperating substances consisting of ammonia, water, and hydrogen.

3. A group of cooperating substances for refrigeration consisting of a gaseous cooling agent, a solvent therefor, and an auxiliary gas which is inert with respect to the cooling agent and of low molecular weight relative to the cooling agent.

4. A group of cooperating substances for refrigeration consisting of a gaseous cooling agent, a solvent therefor, and an auxiliary gas which is inert with respect to the cooling agent and having a common chemical constituent with the cooling agent and of low molecular weight relative to the cooling agent.

5. A group of cooperating substances for refrigeration consisting of a cooling agent having a given chemical constituent, a solvent having the same chemical constituent and a gas consisting of said constituent.

6. A group of cooperating substances for refrigeration consisting of a cooling agent and a solvent therefor having a common product of dissociation and a gas consisting of said product of dissociation.

7. A group of cooperating substances for refrigeration consisting of a cooling agent, a solvent therefor and a gas, all having a common radical.

In testimony whereof we hereunto affix our signatures.

BALTZAR CARL von PLATEN.
CARL GEORG MUNTERS.